Aug. 11, 1925.
C. W. HODGES
1,549,419
NONSKID CHAIN
Filed Oct. 9, 1924
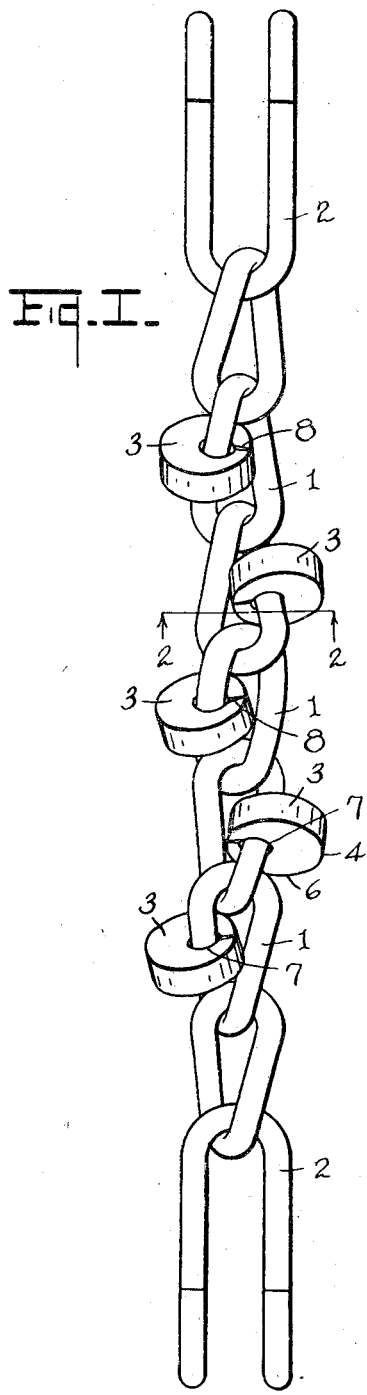
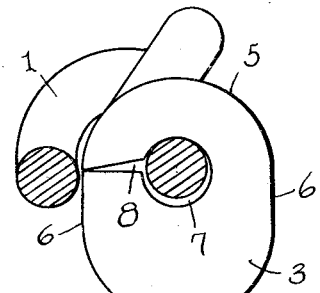
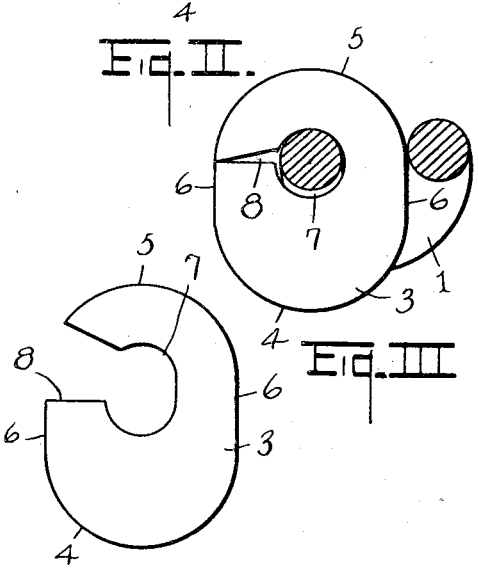
INVENTOR
Chauncey W. Hodges Patented Aug. 11, 1925.

1,549,419

UNITED STATES PATENT OFFICE.

CHAUNCEY W. HODGES, OF GALESBURG, MICHIGAN.

NONSKID CHAIN.

Application filed October 9, 1924. Serial No. 742,617.

*To all whom it may concern:*

Be it known that I, CHAUNCEY W. HODGES, a citizen of the United States, residing at Galesburg, county of Kalamazoo, State of Michigan, have invented certain new and useful Improvements in Nonskid Chains, of which the following is a specification.

This invention relates to improvements in non-skid chains.

The main object of the invention is to provide an improved cross chain or cross member for non-skid chains for vehicle wheels which is very durable and is efficient in the matter of traction of the anti-slipping qualities.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is a plan view of a tread chain embodying the features of my invention.

Fig. II is a cross section on a line corresponding to line 2—2 of Fig. I, illustrating the form of the tread members and the relation thereof to the link.

Fig. III is a sectional view corresponding to that of Fig. II with the chain inverted.

Fig. IV is a side view of one of the tread lugs.

In the drawing similar reference characters refer to similar parts throughout the several views, and the sectional views are taken looking in the direction of the little arrows at the ends of the section lines.

Referring to the drawing, my improved cross or tread chain comprises a plurality of links 1, the links illustrated being of the twisted type, and end hooks 2 adapted to be engaged with the side chains.

The plurality of links 1 are provided with tread members 3, these tread members being flat or elongated, the ends 4 and 5 being curved and the sides 6 substantially flat in the embodiment illustrated although other general elliptical forms are suitable.

These tread members 3 have openings 7 disposed nearer one end thereof than the other so that when the tread members are engaged upon the links as illustrated, they are eccentrically mounted or out of balance so that their end 4 swings downwardly under the action of gravity.

The tread members are of such length that complete rotative movement is prevented; at the same time they are free to swing on the links to present their ends 4 downwardly. The tread members are preferably formed of suitable steel with slots 8 extending from the openings 7 so that they may be engaged upon the links and cold shut thereon, as shown in Figs. II, III and IV.

The tread members are preferably arranged so that those of adjacent links are on opposed side portions of the links, as shown in Fig. I.

With this arrangement of parts, I provide non-skid chains which are very efficient in the matter of traction, tendency for the treads to "roll" being minimized and thus reduced traction being effectively overcome and side slipping also is prevented.

The tread members are very durable as substantial wear surfaces are presented and also the links are effectively protected from road wear and the friction of the tread members upon the links is minimized.

Having thus described my invention, what I claim as new and desire to secure by Letters Patent, is:

1. A cross chain comprising links having flat oblong tread members eccentrically mounted thereon so that complete rotative movement of the tread members on the links is prevented while permitting the heavier ends of the tread members to swing downwardly the tread members of adjacent links being arranged on opposed side portions thereof.

2. A cross chain comprising links having flat oblong tread members eccentrically mounted thereon so that complete rotative movement of the tread members on the links is prevented while permitting the heavier ends of the tread members to swing downwardly.

3. A cross chain comprising links having flat oblong tread members loosely and eccentrically mounted thereon.

4. A cross chain comprising links having tread members loosely and eccentrically mounted thereon permitting the heavier sides of the tread members to swing downwardly, the tread members of adjacent links being arranged on opposed side portions thereof.

In witness whereof I have hereunto set my hand.

CHAUNCEY W. HODGES.